W. J. PHELPS.
MEANS FOR SOLDERING END SEAMS OF CANS.
APPLICATION FILED MAR. 21, 1908.

946,733.

Patented Jan. 18, 1910.
4 SHEETS—SHEET 1.

Fig. 1.

Witnesses
Howard N. Orr.

Walter J. Phelps, Inventor,
By E. G. Siggers
Attorney

W. J. PHELPS.
MEANS FOR SOLDERING END SEAMS OF CANS.
APPLICATION FILED MAR. 21, 1908.

946,733.

Patented Jan. 18, 1910.
4 SHEETS—SHEET 2.

Walter J. Phelps, Inventor,

Witnesses

UNITED STATES PATENT OFFICE.

WALTER J. PHELPS, OF BALTIMORE, MARYLAND, ASSIGNOR TO AMERICAN CAN COMPANY, OF NEW YORK, N. Y., A CORPORATION OF NEW JERSEY.

MEANS FOR SOLDERING END SEAMS OF CANS.

946,733.

Specification of Letters Patent. Patented Jan. 18, 1910.

Application filed March 21, 1908. Serial No. 422,481.

*To all whom it may concern:*

Be it known that I, WALTER J. PHELPS, a citizen of the United States, residing at Baltimore, in the State of Maryland, have invented a new and useful Means for Soldering End Seams of Cans, of which the following is a specification.

This invention relates to means for soldering the heads of cans to the bodies thereof, and more particularly to that class of machines known generally to the trade as "floaters." In the machine of this character now in general use, a horizontal track or runway is employed, over which the cans are rolled by an endless chain, paddles, projections, or other analogous devices, the cans being carried past the heating and solder applying means. The continuous rolling of cans is essential to the proper soldering operation in order that said cans may be uniformly heated at the seam along their entire circumference in order that the solder may be properly applied to the end seams. While a continuous rolling of the cans is absolutely essential, as already explained, yet from various causes prior to my invention, the cans were liable to slip or slide upon the track or runway.

One of the primary objects of the present invention is to provide novel means of a simple, inexpensive and effective character for insuring the rolling of the cans by increasing their adhesion to the track or runway, without, however, imparting any material resistance to their movement along said track or runway.

A further object is to provide a machine in which the necessity of chains or other mechanical devices for moving the cans along the track or runway is eliminated, gravity being employed in lieu thereof.

Still another object is to provide novel but simple and effective means for applying the solder to the cans, said means being very economical in the use of solder. And providing a can soldering mechanism in which the soldering irons automatically adjust themselves to variations in diameter of the cans and vertically rise and fall so as to follow and contact with each can as it passes beneath the irons, and in this connection a further object is to provide means whereby the rate of delivery of cans passing down the chute may be controlled, and whereby the feed of solder to the soldering irons may be regulated in accordance with the feed of the cans.

A further object of the invention is to provide a machine having therein a novel arrangement of track structure or runway which is twisted in such a manner that the cans passing thereover, will, during the heating operation, be disposed about transversely horizontal in order to better confine the heat to the ends to be soldered, the said track or runway from the beginning of the soldering operation to the ejecting mechanism at the bottom of the track being transversely twisted so as to tilt the cans and assist them in assuming an upright position in order to insure the solder settling down in the joints and to secure the proper cooling or setting of the soldered joints.

In the accompanying drawings: Fig. 2 is a detail view in elevation of a portion of the opposite side to that shown in Fig. 1, and illustrating more particularly the solder applying mechanism.

Similar reference numerals designate corresponding parts in all the figures of the drawings.

Referring first to the embodiment disclosed in Figs. 1-8 inclusive, a suitable supporting frame 12 is employed that may be of any character, and mounted thereupon, is an inclined track or runway comprising spaced rails 13, which as shown, are formed of T-iron, though they may be constructed in any suitable manner. Guard rails 14 are also provided, the track and guard rails being carried by brackets 15. Any suitable means may be employed for delivering cans to the upper end of the track or runway. In the present embodiment, said means is in the form of an elevator belt 16 that operates around a pulley 17 and has blades 18 that support the cans and carry them upwardly.

Figure 1:
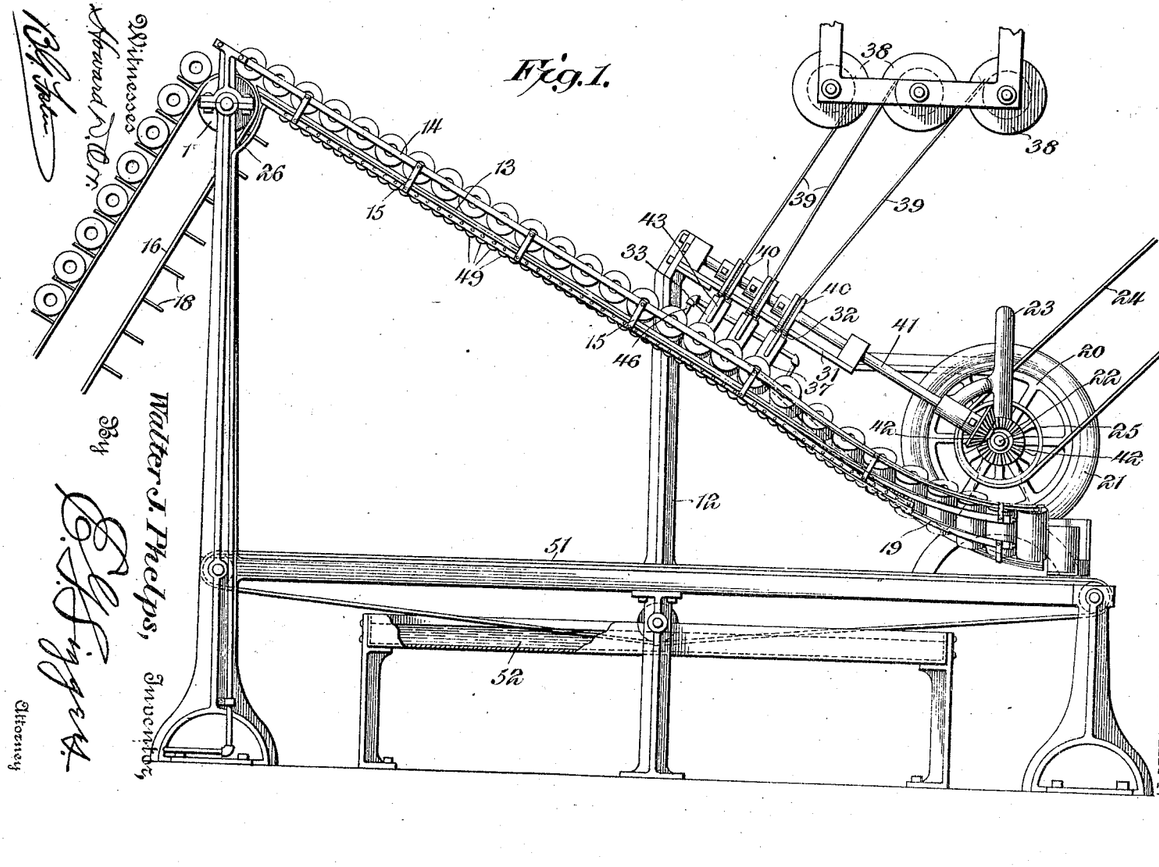
—Figure 1 is a side elevation of a machine, embodying the present invention.
Figures 3, 4, 5, 8:
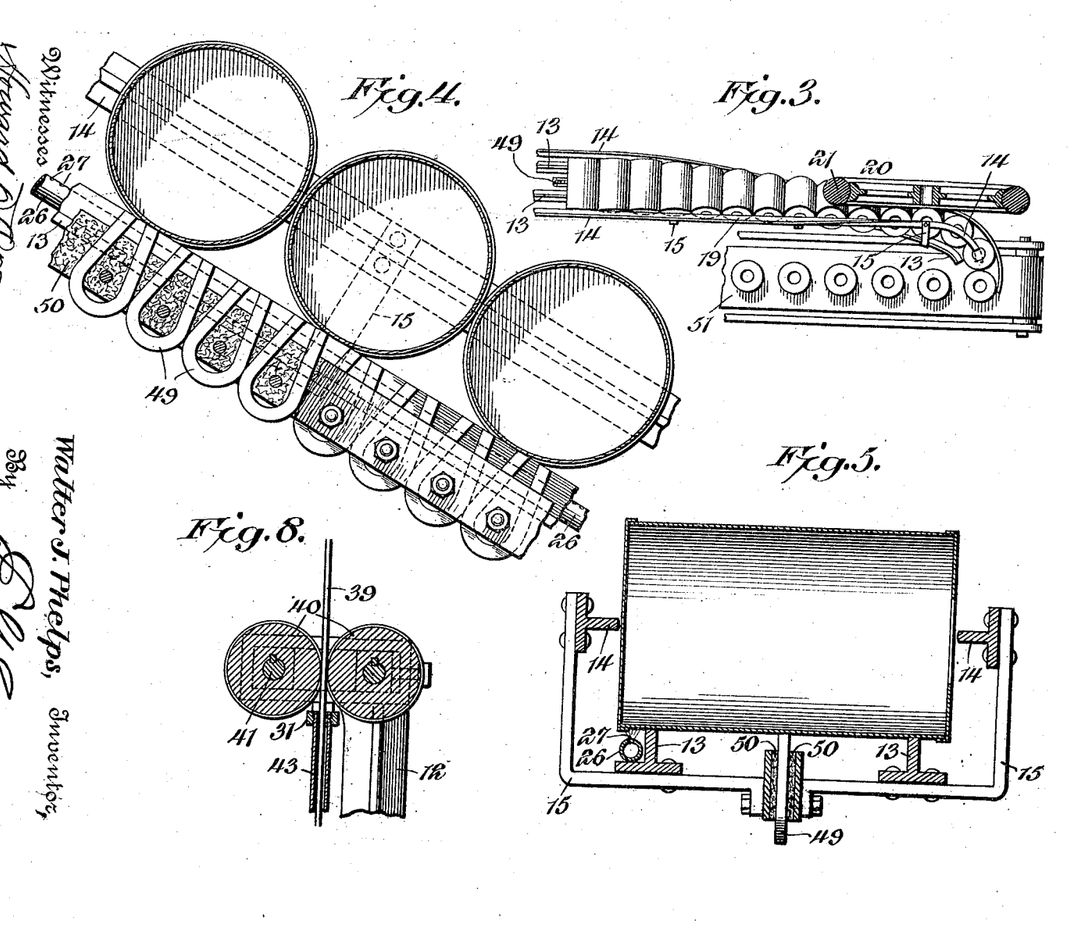
Fig. 3 is a plan view of the lower portion of the machine.
Fig. 4 is a longitudinal sectional view on an enlarged scale showing the magnets.
Fig. 5 is a transverse sectional view of the runway and a can thereon, taken through the can and through one of the magnets.
Fig. 8 is a sectional view through one of the solder feeding devices.
Figures 5, 6, 7:
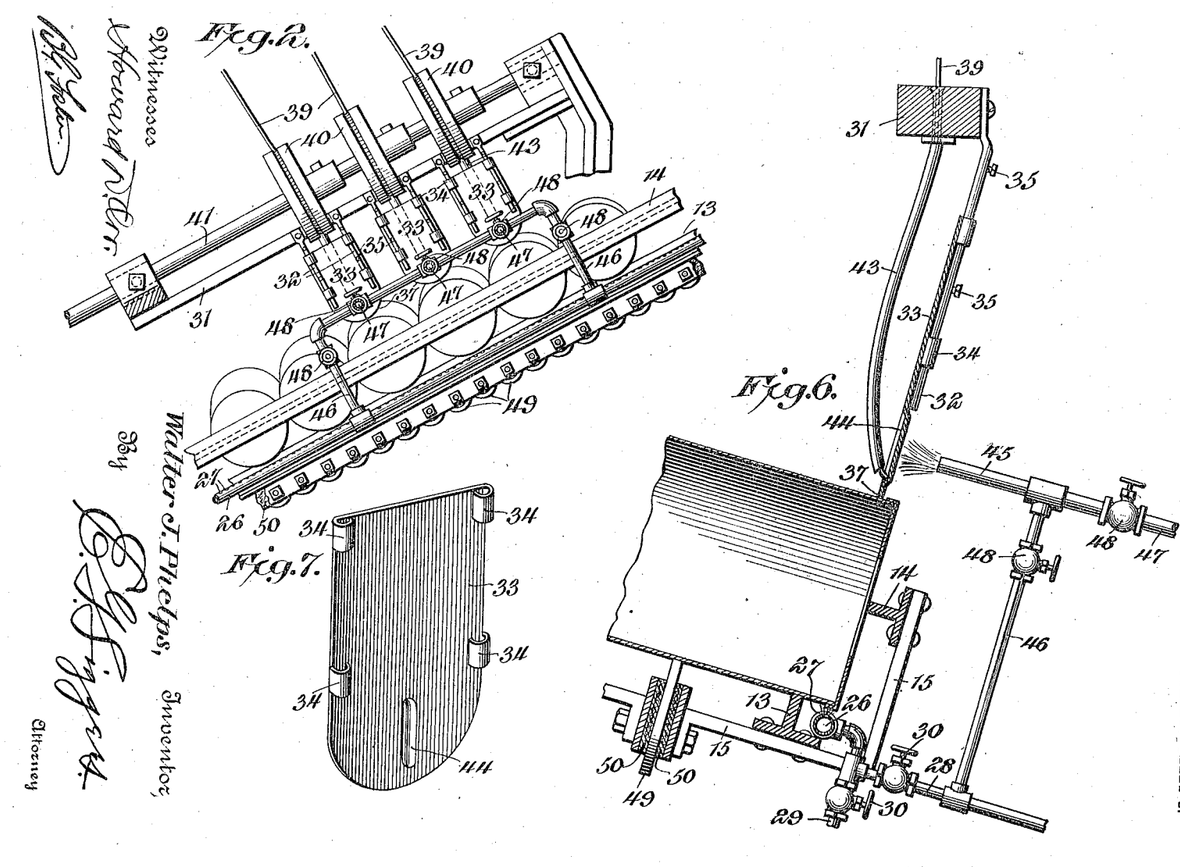
Fig. 6 is a detail cross sectional view through the soldering mechanism.
Fig. 7 is a perspective view of one of the soldering irons.

In the present embodiment, the lower portion of the track or runway is twisted, as illustrated at 19, and associated with said lower portion is means for governing the speed of the cans rolling down the inclined track or runway, said means in the present embodiment, consisting of a vertically disposed wheel 20 having a yielding tire 21 that projects beyond the side of said wheel, as shown in Fig. 3. This wheel is carried by a shaft 22 journaled on suitable bearings in a bracket frame 23, and said shaft is driven by any suitable means, as for instance, a belt 24 operating around a pulley 25 fixed to the shaft.

Extending alongside one of the rails 13 of the run way or track is a burner pipe 26 having a series of discharge orifices 27 in its upper side. A gas supply pipe 28 is connected to the pipe 26 as is also an air supply pipe 29, the passage of gas and air through said pipes being respectively controlled by valves 30 located therein. Associated with the track or runway and arranged above the wheel 20 is soldering mechanism. While this mechanism may be of any desired type well known to the art, the following mechanism is preferably employed. A supporting bar 31 is located above the track, and depending therefrom, are sets of guide rods 32. Soldering irons, in the form of comparatively light plates 33 of steel or other metal, have ears 34 slidably engaged with said rods, the vertical rise and fall movement of the irons, caused by the passage of a can beneath the iron and to compensate for variations in the diameters of cans being limited by stops 35, shown more particularly in Fig. 6. The lower ends of these soldering irons are rounded so as to be raised and lowered by contact with the rounded periphery of the can, as shown at 37 and operate upon the cans adjacent to the seams to be soldered. While three soldering irons are illustrated in the present embodiment, it is to be understood that any number may be employed, according to the diameter of the cans operated upon. Solder is fed to the irons from suitable spools 38, said solder being in the form of wires 39, which are delivered from said spools between feeding rolls 40. Certain of the rolls 40 are carried by a shaft 41, which is geared as illustrated at 42 to the shaft 22, and extending from the feed rolls 40 are guide tubes 43 which direct the ends of the solder against the lower portion of the soldering irons 33, said portions being preferably provided with vertical channels 44 in which the ends of the solder wires are located. The soldering irons are heated by means of burners 45 that project the flames against the opposite sides of said irons to those engaged by the solder wires and said burners are supplied by gas and air pipes 46 and 47 controlled by suitable valves 48.

It will be evident that in this machine, the movement of the cans is effected by gravity, but inasmuch as said cans are comparatively light and ordinarily roll against one another, there is liability of their slipping. To prevent this and insure their rolling, a magnetic field is established which holds the cans firmly against the runway or track, thus securing greater adhesion and insuring the necessary rolling action. In the embodiment of the invention now being considered, this magnetic field is produced by a series of horse-shoe magnets 49 located between the rails 13, said series extending longitudinally thereof. The poles of the magnets are located adjacent to or in actual contact with the cans. These magnets may be disposed in any desired relation, but in the structure illustrated, they are arranged between suitable insulating and non-magnetic strips 50 and are held in place by the inner ends of the brackets 15.

The manner in which the machine operates, is substantially as follows: The elevator 16 carries the cans to be operated upon, to the upper end of the track or runway, and said track or runway is filled with the same. If now the wheel 20 is being rotated, it will be evident that the tire 21 thereof engaging the cans at the lower portion of the row of cans will determine the speed of said cans down the track or runway. Moreover as will be evident by reference to Figs. 1 and 3, said wheel will hold the cans against the twisted portion of the track or runway, thus up-ending them prior to their discharge from the track or runway. As the cans roll down from the upper portion of said track or runway, they enter the magnetic field produced by the magnets, and they will therefore be drawn firmly against the rails 13, producing sufficient adhesion to insure their rolling action without resisting their downward movement. That this is true will be evident from the fact that the magnets on either side of each can are pulling with the same force, and consequently there is no tendency of the cans to stick or hold back at any point. The ends to be soldered of the rolling cans pass over the burners, and are therefore thoroughly heated on all sides. These heated ends successively engage the soldering irons, and the solder delivered thereto will be applied to the cans, each soldering iron operating upon a different portion of the can. After passing said irons, the cans are turned upon end when engaged by the tire 21 of the wheel. Any suitable means may be employed for removing the cans. Thus in the present embodiment, the usual cooling belt 51 is employed that operates through a tank 52 of liquid, the end of the belt being located beneath the end of the runway.

There are a number of advantages for this structure. In the first place, chains or other devices for moving the cans are dispensed with, and each can is individually held against the track so that it will revolve. The speed of the can is determined by the speed of the wheel 20, and this automatically determines the feed of the solder, the solder feeding means being geared to said wheel as above described. It will of course be understood that the track or runway may be disposed at any desired angle of inclination, and the force of the magnetic field varied accordingly. Thus if a very steep track or runway is employed more magnetic force is necessary than when the track or runway is at a very slight degree of inclination. Moreover the particular arrangement of the track, so far as the twisting thereof, etc. is concerned, is not vitally important, though the arrangement disclosed is preferred for the reason that the cans are held substantially level or horizontal during the heating operation, and are then tilted to the proper angle for the soldering operation. After the solder has been applied, they are quickly brought to upright positions, while the solder is still molten so as to insure proper cooling or setting of the joints. It will be evident that by this arrangement, during the heating operation, the heat is more nearly confined to the ends of the cans, as it will not as readily travel along the cans as would be the case if said cans were tilted. At the same time, it is to be understood that the above described tilting operation or twisting of the track is by no means essential, and that the other features of the invention will operate nearly as well if the cans are held in tilted relation during their entire travel. While any well known form of solder applying mechanism can be successfully employed, that disclosed has certain advantages. The rounded lower edges of the soldering irons insure not only the proper application of the solder, but wipe it along each can for a considerable distance, a series of said irons being preferably employed in order that too much solder does not have to be delivered to one, which would tend to bind against it and prevent its highly successful operation. The movement of the irons is also desirable inasmuch as the surface against which the solder engages is thus consequently changing, which insures better melting.

Figures 9, 10, 11:
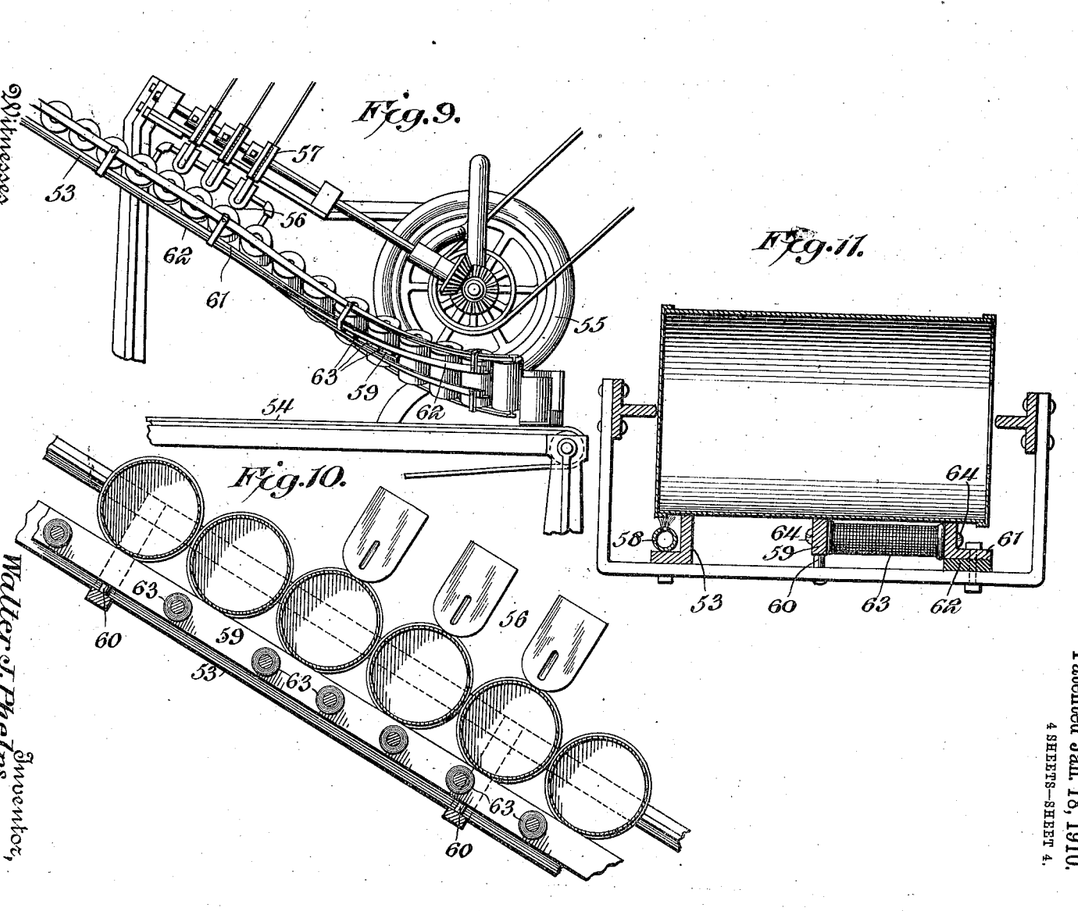
Fig. 9 is a side elevation of a modified form of runway, wherein a magnetized bar is used as a tractor.
Fig. 10 is a longitudinal sectional view therethrough.
Fig. 11 is a transverse sectional view, similar to Fig. 5, showing a modified form of the magnet.

Another embodiment of the invention is disclosed in Figs. 9, 10 and 11, and said embodiment includes a number of important features. The track or runway, designated 53 is substantially the same as that already described, the same delivering to a cooling belt 54, the movement of the cans down the same being governed by a wheel 55, as in the first described embodiment. The soldering mechanism 56 and the solder feeding means 57 correspond to that first described, as does also the heater pipe 58. In this embodiment of the invention, however, electro-magnets are employed for producing the magnetic field. To this end, a magnet bar 59 is located longitudinally between the tracks, being supported by non-magnetic posts 60. One of the track rails, designated 61, is also supported on non-magnetic material 62. Interposed between this rail and the bar 59 are electro-magnets 63, the poles of which are secured thereto by fasteners 64 of magnetic material. With this embodiment of the invention, it will be noted that the rail 61 and bar 59 will be magnetized, and consequently the cans will be strongly held against the same. The magnets may be energized from any suitable source of electricity. In this embodiment therefore one of the rails of the track constitutes a portion of the magnet while the other rail acts as a guard which prevents to some extent the heat traveling to said magnet, and injuring or destroying the insulation of the spools. The electromagnets, as illustrated in Fig. 10, are disposed at suitable intervals sufficient to insure the proper rolling of the cans, and may be located closer together at the soldering mechanism in order to produce a more powerful action at the places where said soldering mechanism tends to resist the rotation of the cans.

While in this application I have shown a runway along which cans are rolled by gravity and to which they are held by magnetic traction, it is obvious that I might use in conjunction with such magnetic tractive means a positive means for moving the cans along a runway, such means being shown in my companion application, Serial No. 434,345, filed May 22, 1908.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention. Moreover insofar as the utility of the invention is concerned, the mechanism can be employed for other purposes of an analogous nature, as for instance in feeding cans to fluxing apparatus, also in can drying mechanism and in can labeling machines.

Having thus fully described my invention, what I claim as new, and desire to secure by Letters Patent is:—

1. In mechanism of the character set forth, the combination with a track or runway against which the cans roll, of soldering mechanism associated therewith, and means for producing a magnetic field in the path of movement of the cans operating against the track or runway to increase their adhesion to the track or runway and thereby insure their rolling thereagainst.

2. In mechanism of the character set forth, the combination with a track or runway against which the cans roll, of soldering mechanism associated therewith, and magnetic means for attracting the cans to the track or runway, to increase their adhesion against the same and insure their rolling.

3. In mechanism of the character set forth, the combination with a track or runway against which the cans roll, of soldering mechanism associated therewith, and a magnet associated with the track or runway for attracting the cans thereto and increasing their adhesion against the same to insure their rolling.

4. In mechanism of the character set forth, the combination with a track or runway against which the cans roll, of soldering mechanism associated therewith, and an electro-magnet associated with the track or runway for attracting the cans thereto and increasing their adhesion against the same to insure their rolling.

5. In mechanism of the character set forth, the combination with a magnetized track or runway against which the cans roll, of soldering mechanism associated with said track or runway.

6. In mechanism of the character set forth, the combination with a track or runway against which the cans roll, of soldering mechanism associated therewith, and a magnet connected to the track for magnetizing the same to increase the adhesion of the cans against said track and insure their rolling thereagainst.

7. In mechanism of the character set forth, the combination with a track or runway against which the cans roll, of soldering mechanism associated with said track or runway, and a plurality of electro-magnets having poles connected to the track or runway for magnetizing the same.

8. In mechanism of the character set forth, the combination with a track or runway against which cans roll, of soldering mechanism associated with said track or runway, a magnet extending longitudinally of the track and having its field extending into the path of movement of the cans passing thereover to increase the adhesion of said cans to said track or runway and insure their rolling action.

9. In mechanism of the character set forth, the combination with a track or runway against which the cans roll, of soldering mechanism associated with said track or runway, a magnet bar extending longitudinally of the track or runway, and a plurality of electro-magnets connected to the bar.

10. In mechanism of the character set forth, the combination with a track or runway against which the cans roll, said track or runway comprising spaced rails, of a magnet bar extending longitudinally between the rails, and electro-magnets connecting one of the rails and the bar, and soldering mechanism associated with said track or runway.

11. In a mechanism of the character set forth, the combination with a downwardly-inclined track or runway for the cans, of longitudinally fixed soldering means associated with the track or runway beneath which said cans roll and with which they contact, means at the bottom of said track or runway for governing the speed of the cans, and means associated with the inclined track for compelling a rolling contact of said cans with the track beneath.

12. In a mechanism of the character set forth, a downwardly-inclined track or runway for the cans, means located at the lower end of the track or runway for governing the passage of cans down the same, a soldering means associated with the inclined portion of the track above the governing means, can heating mechanism located on the inclined portion of the track above the governing means, and means for compelling a rolling contact of the cans with the inclined runway or track.

13. In a mechanism of the character set forth, the combination with a downwardly-inclined track or runway down which the cans roll, of rotary can-governing means located at the lower end of the inclined track or runway for governing the passage of said cans down thereon, soldering means for the cans associated with the track or runway and located above said governing means, can-heating means associated with the inclined portion of the track above the governing means, and means for compelling a rotation of the cans as they pass the heating and soldering means.

14. In a mechanism for treating the periphery of cans, a downwardly-inclined track or runway down which the cans roll by gravity, a rotatable can-engaging wheel at the lower end of said track or runway for governing the speed of the cans down the track, and mechanism located above the governor wheel upon the inclined portion of the track for acting upon the periphery of said cans.

15. In a mechanism for treating the periphery of cans, a downwardly-inclined track or runway down which the cans roll by gravity, soldering means for the cans associated with the track or runway, and mechanism on a lower portion of the track or runway for governing the movement of the cans down the track or runway, said mechanism controlling the feed of solder to the soldering means.

16. In mechanism of the character set forth, the combination with a downwardly inclined track or runway for the cans, of a rotary can engaging wheel located at the lower end of the track or runway for governing the passage of said cans down said track or runway, means for rotating the wheel, and soldering means for the cans associated with the track or runway and located above the governing means.

17. In a mechanism of the character set forth, a downwardly-inclined track or runway down which the cans roll by gravity, a rotary can-engaging wheel located at the lower end of the track or runway for governing the passage of said cans down thereon, a rotary solder-feeding mechanism associated with the track above the governing wheel, and a shaft operated by the governing wheel and controlling the rate of movement of the solder-feeding mechanism.

18. In a mechanism of the character set forth, the combination with a downwardly-inclined track or runway down which the cans roll by gravity, of a rotary can-engaging wheel located at the lower end of the track or runway for governing the passage of said cans down thereon, a soldering mechanism located upon the inclined portion of the track above the governing wheel, rotary feeding wheels feeding solder to the soldering mechanism, and a shaft gearing with the governing wheel and actuating said rotary feeding mechanism.

19. In mechanism of the character set forth, the combination with an inclined track or runway, of means for delivering cans to its upper end, the lower portion of said track or runway being twisted to cause the cans to tilt to an upstanding position, a rotary can engaging wheel located at said twisted portion to govern the passage of the cans down the track or runway, means for rotating the wheel, and soldering means for the heads of the cans associated with the track or runway and located above the wheel.

20. In a mechanism of the character set forth, an inclined track or runway, the upper portion of which is transversely horizontal, the lower portion of which is gradually twisted to cause the cans to tilt to a vertical position, means for holding the cans against the lower twisted portion and governing the speed of their passage down the inclined track or runway, and soldering means for the cans associated with the track or runway above said governing means and at a portion of the track wherein the cans are brought to a position between the horizontal and the vertical.

21. In mechanism of the character set forth, the combination with a track or runway down which the cans gravitate and against which they roll, of magnetic means for attracting the cans toward said track or runway to increase their adhesion and insure their rolling thereagainst, and soldering means associated with said track or runway and operating on the cans that roll thereagainst.

22. In mechanism of the character set forth, the combination with an inclined track or runway down which the cans gravitate, and against which they roll, of magnetic means for attracting the cans toward said track or runway to increase their adhesion and insure their rolling thereagainst, means located at the lower portion of the track or runway for governing their movement down the same, and soldering means associated with said track or runway and operating on the cans that roll thereagainst.

23. In mechanism of the character set forth, the combination with an inclined track or runway down which the cans gravitate and against which they roll, of magnetic means for attracting the cans toward said track or runway to increase their adhesion and insure their rolling thereagainst, means located at the lower portion of the track or runway for governing their movement down the same, soldering means associated with said track or runway and operating on the cans that roll thereagainst, said soldering means being located above the governing means, and can heating means located longitudinally of the track or runway.

24. In mechanism of the character set forth, the combination with a track or runway along which the cans roll, of soldering mechanism associated with said track or runway, and magnetic means for attracting said cans to said track or runway to increase their adhesion thereagainst and insure their rolling, said means being more powerful at the soldering mechanism.

25. In mechanism of the character set forth, the combination with a track or runway along which the cans roll, of soldering mechanism associated with said track or runway, and magnets for attracting said cans to said track or runway to increase their adhesion and insure their rolling thereagainst, the number of magnets being increased at the soldering mechanism to overcome any resistance to the rolling action that may be occasioned by said soldering mechanism.

26. In a mechanism of the character set forth, the combination with a track or runway with which the cans contact to produce a rolling motion thereof, of a guide located contiguous to the track or runway, a soldering iron freely movable vertically on said guide with which iron said cans contact in their downward passage, and means for heating the iron and feeding solder against the same.

27. In a mechanism of the character set forth, the combination of a track or runway along which the cans roll, spaced vertical guide rods located contiguous to the track or runway, a soldering iron fixed in its longitudinal position, but freely movable vertically on said guide rods, and means for feeding solder to the iron between the rods.

28. In a mechanism of the character set forth, the combination with a track or runway along which the cans roll, of a support located contiguous to the track or runway, a longitudinally-fixed soldering iron mounted on the support for free up-and-down movement and having a convexly-rounded lower edge that engages the can.

29. In a mechanism of the character set forth, the combination with an inclined track or runway down which the cans gravitate and against which they roll, of means at the lower end of the track or runway for governing the movement of the cans down the same, a support associated with the runway above the governing means, a series of sets of spaced guides mounted on the support, a series of independent soldering irons, each slidably mounted on one pair of said guides and having rounded lower ends, said irons successively contacting with and engaging the cans passing thereunder, means for heating the irons, and heating means for the cans located on the track or runway in advance of the soldering irons.

30. In a mechanism of the character set forth, the combination with a track or runway against which the cans may roll, of heating means located at an intermediate portion of the track or runway, and soldering means located at a point on the track in rear of the heating means, said track or runway having that portion of it associated with the can heating means transversely level, and having that portion of it associated with the soldering mechanism disposed at an angle which will bring the end of the can being soldered below the other end of the can.

31. In a mechanism of the character set forth, the combination with can heating means and soldering mechanism, of a track or runway over which the cans roll by gravity, said track or runway having the portion associated with the heating means disposed so as to be transversely horizontal, having the portion associated with the soldering mechanism transversely twisted with respect to the first-named portion and having the portion below the soldering means twisted so that the cans are brought to a vertical cooling position.

32. In a mechanism of the character set forth, the combination with a track or runway adapted to support a can transversely and allow it to have rolling contact therewith, of means for creating a field of magnetism in which said cans move to effect their rolling contact against the track or runway.

33. In a mechanism of the character set forth, the combination with a track or runway adapted to support a can transversely and allow it to have rolling contact therewith, of means for producing a magnetic field in the path of movement of the cans to increase their adhesion to the track or runway and thereby compel their rolling contact therewith.

34. In a mechanism of the character set forth, a track or runway adapted to support a can transversely and allow the latter to have rolling contact therewith, means for moving the can along the track, and means for exerting a magnetic attractive force to draw the can into closer adhesion with the track or runway and compel a rolling contact therewith.

35. In a mechanism of the character set forth, the combination with a track or runway adapted to support a can transversely and allow the latter to have rolling contact therewith, of mechanism for operating on the periphery of the can located adjacent to the track, and means for exerting a magnetic attractive force to draw the can into closer adhesion with the track and insure its rolling contact with the track.

36. In a mechanism of the character set forth, a track adapted to support a can transversely and allow it to have rolling contact therewith, of means for exerting a magnetic attraction beneath said track or runway to increase the adhesion of the cans thereto but not prevent the rotation of the cans there-along.

37. In a mechanism of the character set forth, the combination with a track or runway adapted to support a can transversely and allow it to roll there-along, of an electromagnet associated with the track or runway for attracting the cans thereto and increasing their adhesion against the same to insure a rolling contact therewith.

38. In a mechanism of the character set forth, a magnetized track or runway adapted to support cans transversely and allow them to roll there-along.

39. In a mechanism of the character set forth, the combination with a track or runway adapted to support a can transversely and allow it to have rolling contact therewith, of a plurality of electro-magnets having poles connected to the track or runway for magnetizing the same.

40. In a mechanism of the character set forth, a track adapted to support a can transversely and allow it to have rolling contact therewith, means for exerting a magnetic attractive force beneath the whole extent of said track or runway to increase the adhesion of the can thereto but not prevent the movement of the cans there-along.

41. In a mechanism of the character set forth, the combination with a downwardly inclined track or runway for the cans, means at the bottom of said track for governing the speed of the cans, and magnetic means associated with the inclined track for compelling a rolling contact of the said cans with the track beneath.

42. In mechanism of the character set forth, the combination with a downwardly inclined track or runway down which the cans roll by gravity, the discharge end of the track being twisted, of a rotary can-engaging wheel located at the discharge end of the track for governing the passage of the cans down the track as well as up-ending the cans.

In testimony, that I claim the foregoing as my own, I have hereto affixed my signature in the presence of two witnesses.

WALTER J. PHELPS.

Witnesses:
 JOHN H. SIGGIRS,
 FANNIE WAGNER.